United States Patent [19]
Newman et al.

[11] Patent Number: 5,986,352
[45] Date of Patent: *Nov. 16, 1999

[54] SMART PERIPHERAL BACK-POWER PREVENTION

[75] Inventors: Jon B. Newman, Centerville; William P. Baker, Salt Lake City, both of Utah

[73] Assignee: Iomega Corporation, Roy, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/940,765

[22] Filed: Sep. 30, 1997

[51] Int. Cl.$^6$ ....................................................... H02J 1/00
[52] U.S. Cl. ................................ 307/38; 307/40; 307/85; 307/141
[58] Field of Search ................................ 307/38, 85, 116, 307/120; 315/170, 172; 340/509, 511, 540, 635, 653, 657, 660, 664; 364/528.21, 528.26, 528.27, 528.3, 528.32, 707

[56] References Cited

U.S. PATENT DOCUMENTS

| | | |
|---|---|---|
| 4,052,566 | 10/1977 | MacKay .................................. 370/458 |
| 4,052,567 | 10/1977 | MacKay .................................. 370/458 |
| 4,124,888 | 11/1978 | Washburn ................................ 364/200 |
| 4,156,112 | 5/1979 | Moreland ................................ 370/438 |
| 4,377,754 | 3/1983 | Thompson .............................. 307/114 |
| 4,435,706 | 3/1984 | Callan ................................. 340/825.08 |
| 4,558,316 | 12/1985 | Yong ................................... 340/825.06 |
| 4,682,168 | 7/1987 | Chang et al. ........................ 340/825.65 |
| 5,446,320 | 8/1995 | Scharnberg et al. .................... 307/100 |
| 5,483,464 | 1/1996 | Song ....................................... 307/38 |
| 5,486,726 | 1/1996 | Kim et al. .............................. 307/120 |
| 5,553,070 | 9/1996 | Riley ..................................... 370/85.1 |
| 5,613,092 | 3/1997 | Lim et al. .............................. 395/500 |
| 5,684,343 | 11/1997 | Riley ..................................... 307/127 |
| 5,726,988 | 3/1998 | Riley ..................................... 370/489 |
| 5,748,616 | 5/1998 | Riley ..................................... 370/242 |
| 5,764,647 | 6/1998 | Riley ..................................... 370/489 |

*Primary Examiner*—Jeffrey Gaffin
*Assistant Examiner*—Peter Zura
*Attorney, Agent, or Firm*—Woodcock Washburn Kurtz Mackiewicz & Norris LLP

[57] ABSTRACT

An apparatus for preventing peripherals from back powering a host computer is disclosed. The apparatus use a timer and associated logic circuitry to determine the time period between signals being sent to the host computer from the peripheral device. Under predetermined time-out conditions, the current output by the peripheral is disabled to prevent the peripheral from back powering a main computer.

17 Claims, 3 Drawing Sheets

SMART PERIPHERAL BACK-POWER PREVENTION

BACKGROUND OF THE INVENTION

Computer systems typically comprise a CPU and supporting subsystems, such as a memory subsystem, a storage subsystem and a display subsystem. Moreover, while some computer systems are contained within a single host computer box and share a single power source, the vast majority of modern computer systems have at least one peripheral device that is separate from the host computer box and which derives power from an independent power supply. Typically, such a peripheral device communicates with the subsystems in the host computer via a communication bus. These communication buses comprise ground, power, control lines, data lines and so on that links the peripheral device with the host computer.

Because the host computer and the peripheral device are independently powered, they must be independently disconnected from their respective power sources. For example, when the computer system is shut down, it may be the case that the power supply that supplies power to the host computer box is powered down while certain peripheral devices such as printers and disk drives remain powered on. Whenever one of the power source to the host computer is powered down before the peripheral device is powered down. As a result, power may continue to flow from the peripheral device over the communication bus.

This continued power flow has caused problems in some computer systems. Where a host computer is disconnected first, power can flow back from the peripheral subsystem into the host computer and wreak havoc on the states of certain subsystems within the host computer. Potentially, the back power could place the host computer into a state so that it will not properly restart without taking remedial measures.

Accordingly, there is a need for a peripheral device that prevents back powering host computers.

SUMMARY OF THE INVENTION

The present invention meets the above need by providing an apparatus use in a computer system having a host computer in electrical communication with a peripheral subsystem via an electrical bus, wherein the host computer and the peripheral subsystem have independent power supplies. The electrical bus typically comprises a plurality of signal lines that electrically couple the host computer to the peripheral subsystem. The apparatus determines when the states of selected bus lines have remained unchanged for a predefined time period. After determining that the selected bus lines have not changed states during the predefined time period, the current flowing from the peripheral device to the bus is changed to a low current state.

The electrical apparatus comprises timing mechanism and an enablement mechanism. The timing mechanism outputs a signal when at least one of the bus signal lines has not changes states for a predetermined period of time. The enablement mechanism is in electrical communication with the timing means and controls a current output from said peripheral subsystem onto said bus in response to said signal output from said timing mechanism. Accordingly, whenever the timing mechanism indicates that the predefined period has passed without a signal line state change, the current output from the peripheral subsystem onto the bus is reduced.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides an apparatus for preventing back power flow in a computer system. Throughout the description, a preferred embodiment of the invention is described in connection with a computer bus connection, such as one that is commonly referred to in the personal computer industry as a "parallel bus." However, the bus shown only illustrates the operation of the present invention and is not intended as limitations. For example, the invention is equally applicable to other bus systems such as the Small Computer Systems Interface (SCSI) bus. Accordingly, the invention should not be limited to the embodiment shown.

Figure 1:
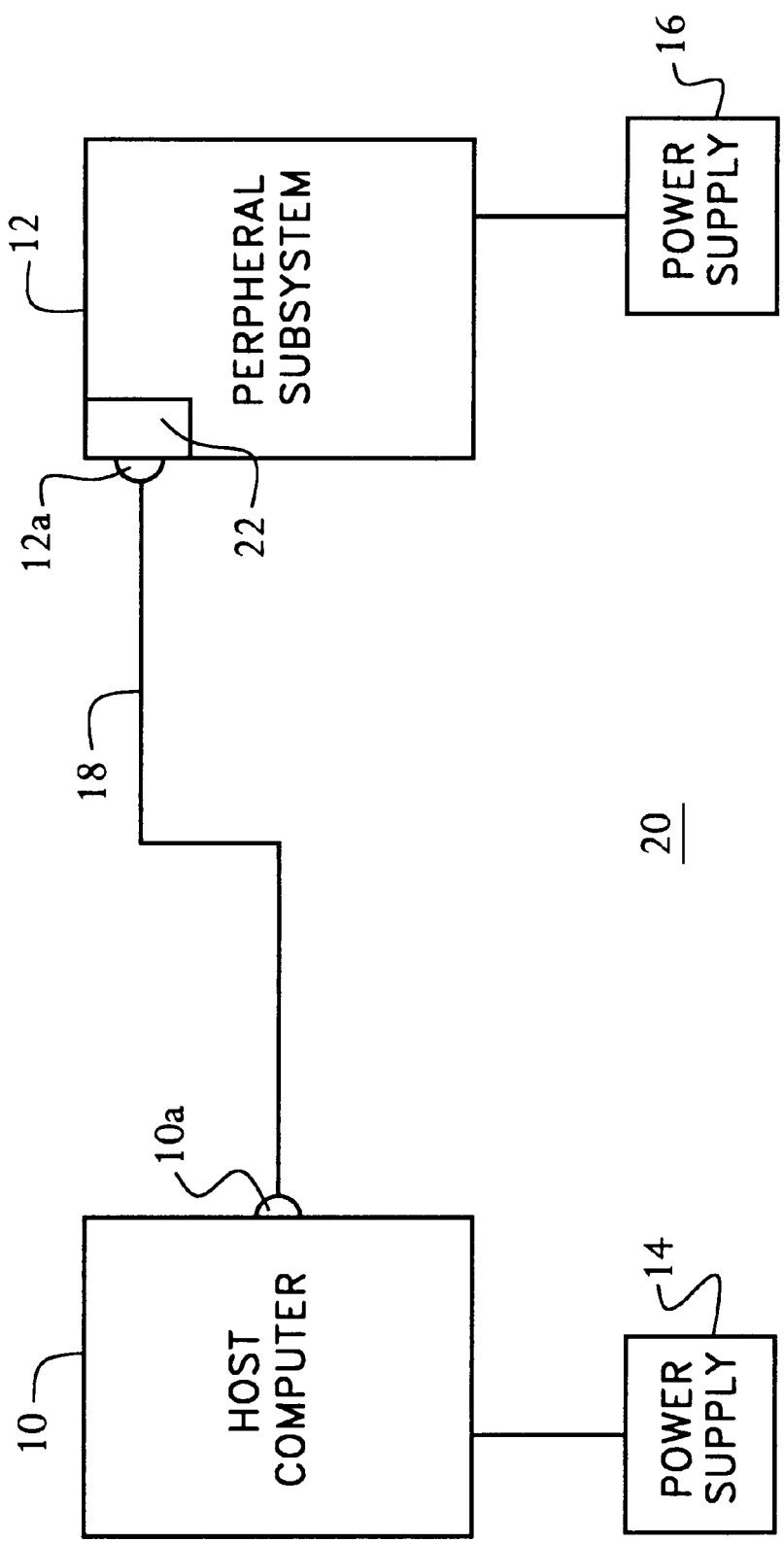
FIG. 1 is a block diagram of a computer system incorporating aspects of the present invention.

FIG. 1 is block diagram of a computer system 20 that incorporates the present invention. The computer system comprises a host computer 10 having a power supply 14 that provides power to the internal components such as a CPU, a memory subsystem and so on. The computer system also comprises peripheral subsystem 12 which is contained in a separate box external to the host computer 10. The peripheral 12 has a separate power supply 16 which supplies power to peripheral subsystem 12 independently from power supply 14. Peripheral subsystem 12 and host computer 10 are in electrical communication via bus 18. Bus 18 is coupled to host computer 10 via connector 10a and is coupled to peripheral subsystem 12 via connector 12a.

Figure 2:
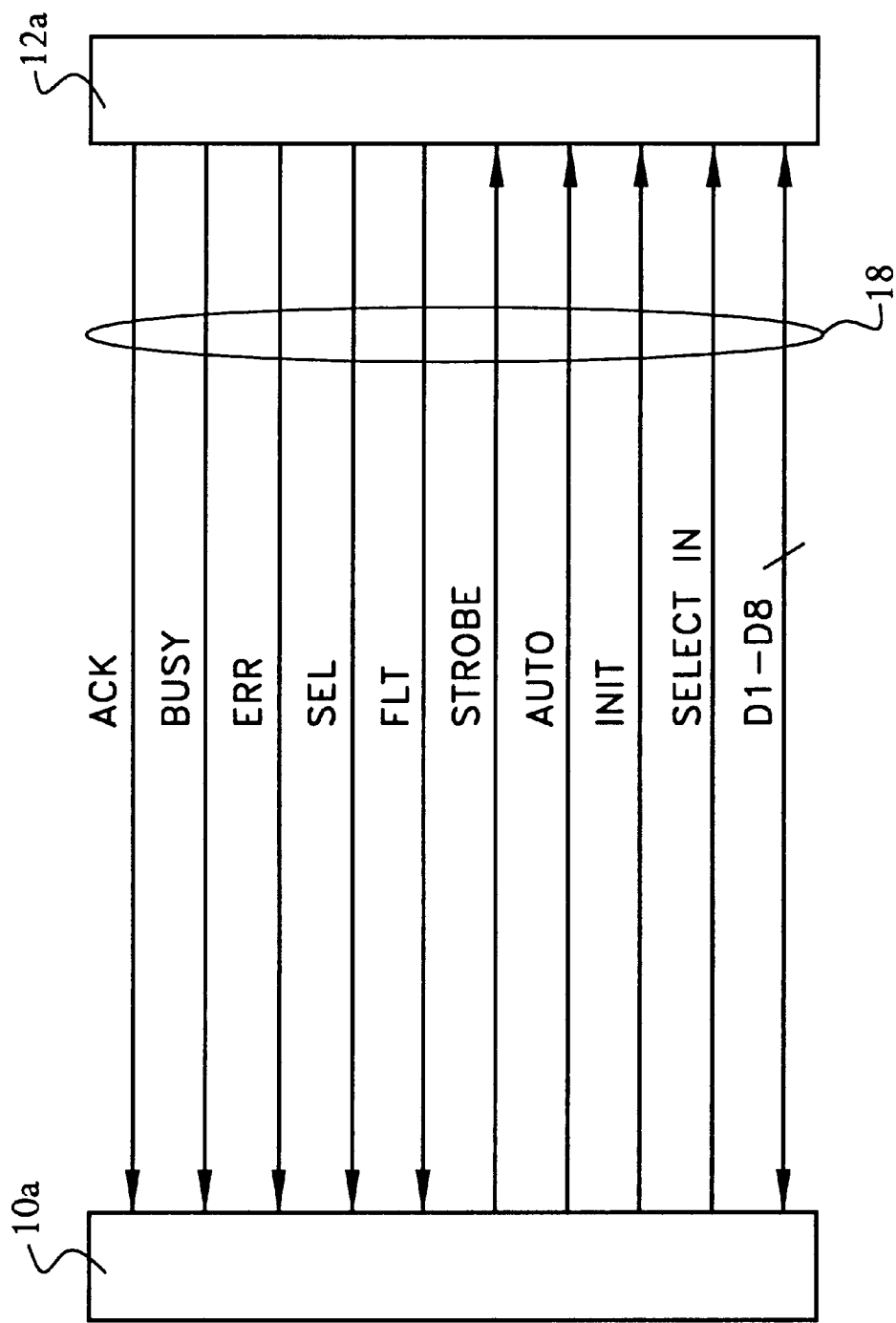
FIG. 2 schematic diagram of a bus for interconnecting subsystems in accordance with the present invention.

FIG. 2 shows an exemplary bus for coupling host computer 10 to peripheral subsystem 12. The exemplary bus shown comprises the bus lines of a parallel bus connection, which is commonly used to connect printers and disk drives to a host computer in the personal computer industry, such as host 10. Bus lines ACK, BUSY, ERR, SEL, and FLT carry control signals from the connector 12a of peripheral subsystem 12 to connector 10a of host computer 10a. Bus lines STROBE, AUTO, INIT, and SELECTIN pass control information from connector 10a of host computer 10 to connector 12a of peripheral subsystem 12. Bus lines D1 through D8 carry bidirectional data between connector 10a and connector 12a.

Because the power supplies 14 and 16 of FIG. 1 are independent, either supply 14, 16 will continue to provide power when the other supply 16, 14 is disconnected (e.g., turned off). This independent operation of the power supplies could cause problems to computer system 20, and more particularly to host computer 10, if power supply 14 is turned off while power supply 16 remains on. In such a case, power could flow from peripheral subsystem 12 into host computer 10. In the exemplary bus shown in FIG. 2, power can continue to flow from the peripheral subsystem 12 to host computer 10 over bus lines (also referred to herein as input signal lines) acknowledge (ACK), busy (BUSY), error (ERR), select (SEL), and fault (FLT).

Figure 3:
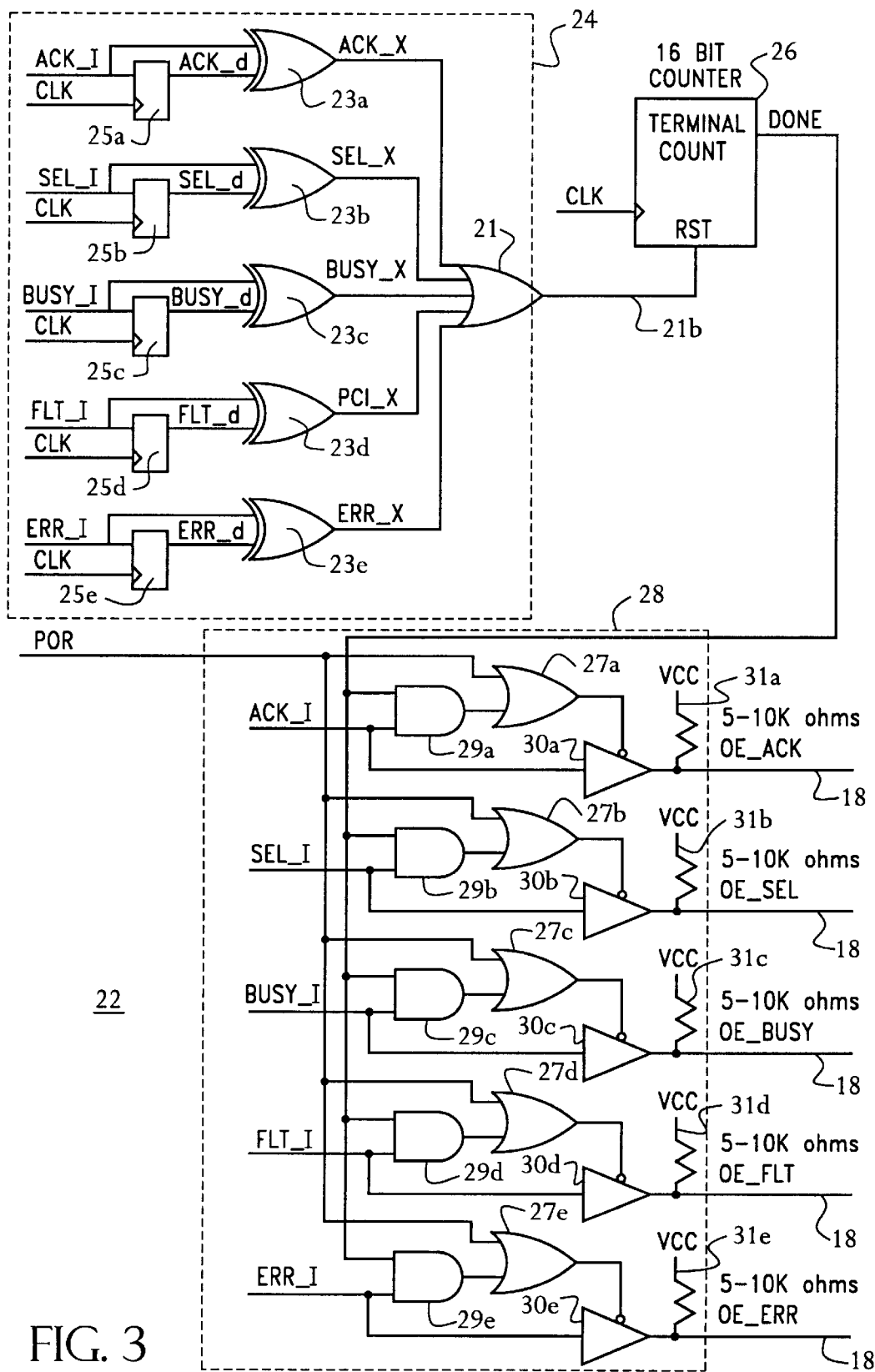
FIG. 3 is a logic schematic illustrating an embodiment of the present invention.

To prevent the back power from flowing from peripheral subsystem 12 into host computer 10 during power down of power supply 14, back-power prevention circuit 22 is provided in peripheral subsystem 12. FIG. 3 provides further details of a preferred embodiment of back-power prevention circuit 22. Back-power prevention circuit 22 comprises three main parts: (1) a signal change detection circuit 24, which determines whether any of the input signal lines have changed states; (2) a delay counter 26, which determines the time-out period for back-power prevention circuit 22; and (3) a bus line enable circuit 28, which contains the logic for determining when to enable and disable high and low current output states.

Signal change detection circuit 24 further comprises a series of flip-flops, preferably D-type flip-flops, EXCLUSIVE-OR gates 23, and a single OR gate. Each bus line capable of back powering host computer 10 (e.g., ACK, BUSY, ERR, SEL, and FLT) is fed into a flip-flop 25 with a clock signal (CLK) provided by a clock (not shown). This flip-flop 25 provides a delay to the input signals (the input signals are represented by appending a "$_{13}$ I" to each bus line symbol). The output from the flip-flops 25 are connected to the input of an EXCLUSIVE-OR gate 23. The other input to EXCLUSIVE-OR gate 23 is the original input signal. For example, BUSY input signal BUSY_I is input to flip-flop 25c. The output from flip-flop 25c is EXCLUSIVE-OR'd via gate 23c with BUSY_I. The outputs from each EXCLUSIVE-OR gate 23 is connected to an OR gate 21. Accordingly, flip-flop 25 stores the signal in its previous state for comparison to the signal in its present state. Any time a signal changes, the current state (indicated on the "_I" signal line) and the previous signal (stored in the flip-flop) will be different. The difference will pass a high signal through EXCLUSIVE-OR gate 23 and into OR gate 21. When any one of the outputs ("signal_X") from any one of the EXCLUSIVE-OR's is high, the output signal 21b from the signal change detect circuit 24 will be high indicating that at least one input signal has experienced a change of state.

Signal change detect circuit 24 is connected to sixteen-bit counter 26 via output line 21b to measure the time between input signal changes. Counter 26 provides a time-out function for the back-power prevention circuit 22. Accordingly, if a predetermined period of time has passed without a change in state of any one of the input signals, peripheral subsystem 12 should stop driving current to the host computer 10 (see FIG. 1). On the other hand, if the state of any of the input signals has changed during the predetermined period, the predetermined period should start over before determining whether a time out has occurred. The predetermined time period is selected by the number of bits in the counter and the frequency of a clock signal (CLK), which is provided to counter 26. For example, selecting a higher frequency CLK signal or a low bit count will decrease the time-out period.

To accomplish the time-out function, counter 26 counts to ($2^{16}$–1) and thereafter outputs a high signal (DONE) that indicates there has been no change to any of the input signals during the predetermined period of time. However, if a change in input signal occurred during the predetermined period, i.e. before the counter has counted to ($2^{16}$–1), counter 26 resets and begins counting the predetermined period once again. Accordingly, each time one of the input signals to the signal change detect circuit 24 changes, counter 26 is reset and begins counting again, without outputting a high DONE signal.

Bus line enable circuit 28 provides the final section of back-power prevention circuit 22. Enable circuit 28 comprises a series of AND gates 29, OR gates 27, and line drivers 30. Each input signal (e.g., ACK_I, SEL_I, and so on) is connected to an AND gate 29. For example, BUSY_I signal is connected to AND gate 29c. AND gates 29 AND's the input signals with the DONE signal that is output from counter 26. Thus the output from AND gate 29 will be high when the input signal line is high and the DONE signal is high. Otherwise, if either the input signal is low or the DONE signal is low, then the AND gate 29 output will be low. The output from each AND gate 29 is connected to an OR gate 27. For example, AND gate 29c is connected to OR gate 27c, AND gate 29d is connected to OR gate 27d, and so on. Power-on-reset (POR), which is assumed to be active high in the present embodiment, is also provided as an input to each OR gate 27. The output from AND gates 29 are thus OR'd with POR. Accordingly, if either POR or the output from AND gates 29 is high, then the output from the respective OR gate 27 will also be high. Otherwise, if both inputs are low, the output from the respective OR gate 27 will also be low. For example, if the output from AND gate 29c is high, indicating a signal on the BUSY line, the output from OR gate 27c will also be high. Additionally, if the POR is high, indicating that the peripheral power supply 16 (see FIG. 1) has been reset, then the output from OR gate 27c will also be high. This POR reset feature allows the input signal (e.g., BUSY) to be disabled during a power on reset so that back power is not fed to host computer 10 when the state of counter 26 and other signals are unknown.

The output from OR gates 27 is connected to a respective line driver 30. For example, OR gate 27c is connected to line driver 30c, OR gate 27d is connected to the enable of line driver 30d, and so on. Line drivers 30 provide the current to drive a respective input signal over bus 18 to host computer 10. Therefore, the input signal lines are also connected to the input of line drivers 30. So in general, the line drivers drive the input signal lines over the bus 18. However, the output from drivers 30 should be driven to a high impedance state during periods of time-out, so that the peripheral does not power the host computer. Additionally, the output from drivers 30 should be driven to a high impedance state during power on resets, independent of the state of the input signal line.

This high impedance state is accomplished by connecting the output of OR gates 27 to the enable on line drivers 30. As a result, whenever the output from an OR gate 27 is high, the corresponding driver 30 is disabled. Conversely, whenever the output from an OR gate 27 is low, the corresponding driver is enabled. The various states of enable circuit 28 can be better understood by referring to the truth table below wherein a zero ("0") represents a low state, a one ("1") represents a high state, and a "Z" represents a high impedance state:

TABLE 1

The states of enable circuit 28 of Line Driver 30

| DONE | Signal_I | POR | Enable of Line Drivers 30 | OE_signal | Output to bus (Pulled-up) |
|---|---|---|---|---|---|
| 0 | 0 | 0 | 0 | 0 | 0 |
| 0 | 0 | 1 | 1 | Z | 1 |
| 0 | 1 | 0 | 0 | 1 | 1 |
| 0 | 1 | 1 | 1 | Z | 1 |
| 1 | 0 | 0 | 0 | 0 | 0 |
| 1 | 0 | 1 | 1 | Z | 1 |
| 1 | 1 | 0 | 1 | Z | 1 |
| 1 | 1 | 1 | 1 | Z | 1 |

Whenever DONE is zero, indicating no time-out has occurred, the input where Signal is one of Ack, Sel, and so on signal (Signal_I) should continue to be driven unless a POR has occurred. If a POR has occurred driver 30 should be changed to a high impedance state by changing enable to a one. When the input signal is a zero, it can continue to be driven unless there is a POR. Notably, the input line (i.e., Signal_I) zero is driven even when the DONE line is a one, indicating a time-out. That is because driving a zero will no cause back-power voltage in host computer 10. When the state of the driver changes to a high impedance state, one is output on the respective bus line. However, although a one is output, very little current and consequently back power is driven in the host. Pull-up resistors 31, which are connected to the output of drivers 30 provide the high state when a corresponding driver is put into a high impedance state.

The above description of preferred embodiments is not intended to impliedly limit the scope of protection of the following claims. Thus, for example, except where they are expressly so limited, the following claims are not limited to applications involving parallel bus systems.

What is claimed is:

1. An electrical apparatus for use in preventing back-power in a computer system having a host computer in electrical communication with a peripheral subsystem via an electrical bus, the electrical bus comprising a plurality of signal lines, and wherein the host computer and the peripheral subsystem have independent power supplies, said electrical apparatus comprising:

a counter circuit having a predetermined count period for outputting a signal when at least one of said signal lines has not changed states during the predetermined count period; and, a logic circuit coupled to the output from said counter circuit such that output from said peripheral device to selected ones of said signals lines is enabled when the counter circuit outputs the signal thereby controlling a current output from said peripheral subsystem onto said bus, wherein said logic circuit comprises a tristate device having an input, an output, and an enable, said input being connected to one of said plurality of signal lines, said output being connected to a corresponding signal line of said bus and said enable being coupled to said counter circuit such that said tristate device enters a high impedance state when said counter circuit reaches the maximum count value.

2. The electrical apparatus as recited in claim 1 wherein said logic circuit further comprises an AND gate having one input electrically coupled to said counter output and another input coupled to one of said signal lines and an output coupled to said enable of said tristate device such that said tristate device enters the high impedance state when said maximum count value is reached and said one of said signal lines is high.

3. The electrical apparatus as recited in claim 1 wherein said tristate device comprises a current driver.

4. The electrical apparatus as recited in claim 1 wherein said electrical bus comprises a parallel bus.

5. The electrical apparatus as recited in claim 4 wherein said plurality of signal lines comprise at least one of Acknowledge, Select, Busy, Fault, and Error signal lines.

6. A peripheral device configured for connection to a host computer via at least one input signal from said host computer and one output signal to said host computer, said peripheral device comprising:

a power supply;

an electrical circuit for generating said one output signal to be output to said host computer by way of a bus line;

a back-power circuit for controlling the output of said one output signal from said electrical circuit to said bus line so that high current signals are disabled when said host is in a low power state, wherein said back-power circuit comprises a tristate device that enters a high impedance state when said circuit for controlling the output indicates that said host is in a low power state.

7. The peripheral device as recited in claim 6 wherein said back power circuit further comprises a timer circuit coupled to said tristate device such that after a predefined time period without an input signal from said host computer said timer circuit outputs a signal to cause said tristate device to enter the high impedance state.

8. The peripheral device as recited in claim 7 wherein said timer comprises a counter device.

9. The peripheral device as recited in claim 6 wherein said back power circuit further comprises an logic gate coupled between said timer circuit and said tristate device such that said tristate device only enters said high impedance state when said timer outputs a signal indicative of an inactive host computer and said at least one output signal is producing a high voltage signal.

10. The peripheral device as recited in claim 9 wherein said logic gate comprises an AND gate.

11. The peripheral device as recited in claim 6 wherein said tristate device comprises a current driver.

12. The peripheral device as recited in claim 6 wherein said peripheral device is adapted for connection to said host computer over a parallel bus.

13. The electrical apparatus as recited in claim 12 wherein said at least one output signal comprise a signal to at least one of Acknowledge, Select, Busy, Fault, and Error signal lines.

14. Method for preventing a peripheral device from back-powering a host computer wherein the peripheral is connected to the host computer by way of a bus, the method comprising the steps of:

detecting the absence of host activity on the bus by measuring signal changes on the bus;

after the signal on the bus have not changed for a predetermined period of time, preventing the output of logical high signals from the peripheral to the bus wherein the output of logical high signals are prevented by disabling a driver that outputs a signal from the peripheral device onto the bus.

15. The method as recited in claim 14 wherein the signal changes are measured by monitoring the bus control lines.

16. The method as recited in claim 15 wherein the bus comprises a parallel bus.

17. The method as recited in claim 16 wherein the control lines comprise at least one of Ack, Sel, Busy, Flt, and Err.

* * * * *

UNITED STATES PATENT AND TRADEMARK OFFICE
CERTIFICATE OF CORRECTION

PATENT NO. :     5,986,352
DATED       :    November 16, 1999
INVENTOR(S) :    Jon B. Newman and William P. Baker It is certified that error appears in the above-identified patent and that said Letters Patent is hereby corrected as shown below:

Col. 1, line 55, "changes" should be -changed-.

Col. 5, line 6, "no" should be -not-.

Signed and Sealed this

Twenty-third Day of May, 2000

Attest:

Q. TODD DICKINSON

*Attesting Officer*            *Director of Patents and Trademarks*